(12) United States Patent
Pattabhi et al.

(10) Patent No.: US 7,882,134 B2
(45) Date of Patent: Feb. 1, 2011

(54) NON-REPEATING RANDOM VALUES IN USER SPECIFIED FORMATS AND CHARACTER SETS

(75) Inventors: Ravi Pattabhi, Stow, MA (US); Harish Akali, Merrimack, NH (US); Luming Han, Allston, MA (US); Xiaolan Shen, Nashua, NH (US); Andrew Bodge, Acton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 451 days.

(21) Appl. No.: 12/150,392

(22) Filed: Apr. 28, 2008

(65) Prior Publication Data

US 2009/0271361 A1  Oct. 29, 2009

(51) Int. Cl.
*G06F 7/00* (2006.01)
*G06F 17/30* (2006.01)

(52) U.S. Cl. .................................. 707/791; 707/802
(58) Field of Classification Search ........................ None
See application file for complete search history.

(56) References Cited

U.S. PATENT DOCUMENTS

2004/0205604 A1* 10/2004 Read ........................... 715/517
2006/0106976 A1*  5/2006 Michael ........................ 711/108

* cited by examiner

*Primary Examiner*—Kuen S Lu
*Assistant Examiner*—Tuan Pham
(74) *Attorney, Agent, or Firm*—Kraguljac & Kalnay, LLC

(57) ABSTRACT

Systems, methodologies, media, and other embodiments associated with producing non-repeating random values for use in data masking are described. One example method includes accessing data describing a mask for a value in a database table column to be masked. The example method may also include identifying a number of distinct values in the database table column to be masked and determining a field width for a mask to provide unique random numbers to mask the distinct values. The method may include identifying locations in a mask value to store the unique random value and locations in a mask value to store filler values. The mask value may include different character sets and may comply with user specified formats. The method may include generating a set of statements that when executed produce a mapping table that includes masks for distinct values in the database table column to be masked.

23 Claims, 8 Drawing Sheets

US 7,882,134 B2

NON-REPEATING RANDOM VALUES IN USER SPECIFIED FORMATS AND CHARACTER SETS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Random number generators generate random numbers. While the numbers produced may be pseudo-random, a set of random numbers may have repeating values. Some applications may desire non-repeating random numbers. Random numbers are numbers. Some applications may desire non-repeating random character strings or combined number-string values. Generating a random number takes a period of time. When a large data set of random numbers is required, the period of time may be correspondingly large. Checking a large data set to insure there are only non-repeating values may increase the period of time.

Data masking is one application where non-repeating random numbers and/or values (e.g., character strings) may be desired for large data sets. Data masking seeks to hide sensitive information with similar looking but false data. Consider testing a database application that processes social security numbers and automobile license plate numbers. A statewide table may include millions of non-repeating records. It may be desired to perform the testing on similar looking but false data rather than on the original sensitive data. The mask values required for this application would need to meet constraints concerning uniqueness, character sets appropriate to the language used, formatting rules, and so on. However, conventional random number generators may not be configurable to produce these types of mask values.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
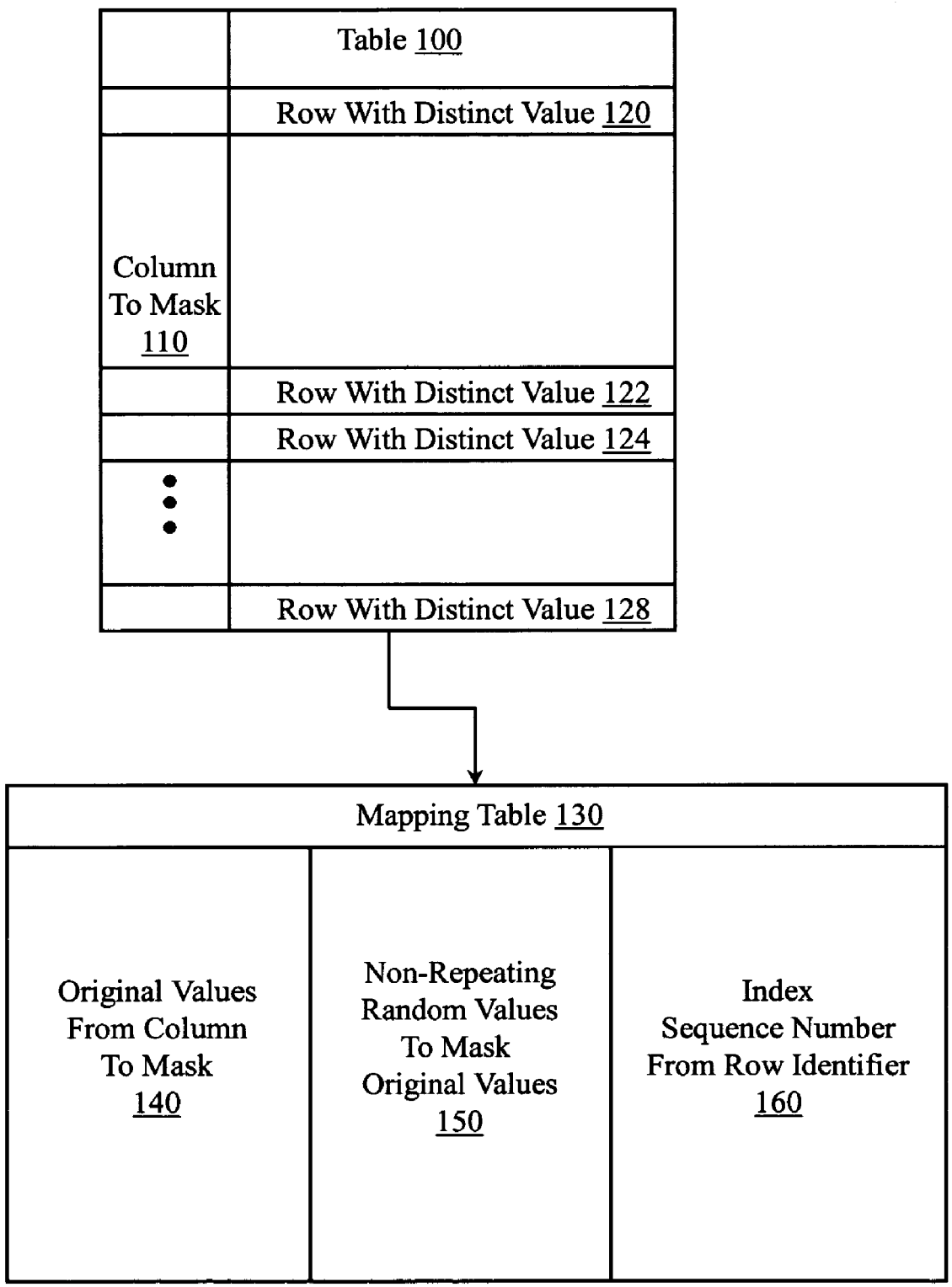
FIG. 1 illustrates an original table having a column to be masked and an example mapping table used by example systems and methods for producing non-repeating random values (NRRVs) in user specified formats and character sets.

Example systems and methods produce non-repeating random values (NRRVs) in user-specified character sets. The NRRVs comply with user-specified formats. The NRRVs may be used to mask selected data in a database table. One example system can mask data in a column having a set of N NRRVs in O(N) time. The NRRVs may be numbers, strings, combined number-string values, and so on.

Consider a license plate data masking operation. A license plate may have a three character leading string followed by a dash followed by a five digit numeric field. This data masking operation may not consider "custom" license plates. License plates in the United States may have English letters and numbers. However, license plates in another country may have letters in a different language and may have numbers from a different character set.

For the English language and number example, a three character string plus five digit number would allow for approximately 2 trillion ($26^3 * 10^5$) different combinations. It is unlikely any country would have this many license plates. It is even more unlikely that any smaller unit (e.g., state, county, township, company) would have this many license plates. Thus, a data masking operation that requires NRRVs may achieve those NRRVs by manipulating a subset of characters and/or digits smaller than the complete set of characters and/or digits.

More generally, consider a data masking operation to provide a non-repeating random value (NRRV) for a data value with a field width of X changeable locations. Example systems and methods may produce an NRRV with a field width of Y (Y<X) that can be combined with a random and/or non-random value of field width Z (Z<X, Y+Z=X) to produce the NRRV of field width X. This may facilitate reducing the time required to produce NRRVs for subsets of large data sets. For example, if a test of the license plate system requires a sample data set with at least one thousand NRRVs, then less than all the three digits and all the five numbers need to randomized. In one example, it may be specified to fix the alphabetic portion (e.g., ABC) and to fix one of the digits. In this example, it may be specified to randomize only four digits. To insure that none of the random numbers repeat, the set of values for the four digits may be generated in sequence (e.g., 0001, 0002, 0003). While this sequence may not appear "random", it satisfies the requirements of non-repeating. While a numeric example is provided, it is to be appreciated that alphabetic portions of the license plate may also need to be randomized. In this case a five digit NRRV may still be produced and one of the digits in the NRRV may be mapped from base ten to base 26 to facilitate producing the randomized character.

A more sophisticated approach to generating the "sequence numbers" may be taken. For example, for a column to be masked, an SQL statement may "select distinct" from the column. The SQL statement may return a row number associated with the distinct value. This row number may then be used as the sequence number to insure non-repeating values. The row number may also be used to create a mapping between a mask value and a value to be masked. Since the distinct value is the value to be masked, and since the row number of the row having the value to be masked is provided, a mask table may be built where pre-computed mask values are stored and available for subsequent masking. To facilitate reusing NRRVs and/or using the NRRVs at a later point in time and/or to facilitate faster execution at mask time, the NRRVs may be stored along with the original value in a table that is indexed using the row number from which the original distinct value was supplied in response to the "select distinct".

Returning to the license plate example, to make the overall license number appear more random, random strings may be generated for the alphabetic portion and a random number may be generated for the remaining digit. Since the four digit portion that is populated using a sequence number is guaranteed to be non-repeating, combining the non-repeating sequence numbers with the random (though possibly repeating) alphabetic portion and random (though likely repeating) single digit produces a more random appearing value. While a sequence 0001, 0002, . . . is described, to improve the appearance of randomness, a slightly wider field width than required may be specified as being random and non-repeating. For example, all five digits may be specified as being random and non-repeating. Thus, ninety nine thousand, nine hundred and ninety nine possible numbers are possible. Rather than pick one thousand numbers in sequence, numbers from the larger set of possible numbers may be selected randomly, without repeating. As described above, rather than picking an arbitrary sequence number, a row number associated with a column entry returned by a "select distinct" SQL may be used as the sequence number. One skilled in the art will appreciate that other approaches to generating non-repeating sequence numbers may be employed. Regardless of the selection method, the overall masking process that relies on the mapping table will be performable in O(N) time.

Example syntax for describing a mask may include elements for identifying a language, an alphabetic portion, a numeric portion, field widths and so on. In one example, a mask for the license plate described above may be specified using, for example:

Number_set=English;

Alphabetic_set=English;

Mask_column=license_plate;

Mask=$RS(3)+FS("-")+RD(5)$.

The Number_set value and the Alphabetic_set value establish the number and character set for the mask. The Mask_column specifies which column in a database table is to be masked. The Mask value includes a three character random string (RS), a one character fixed string (FS), and a five digit random number (RD). As described above, less than all eight of the changeable locations in the nine location field may need to be randomized and non-repeating. Thus, example systems may, during a format processing phase, sample the column to be masked with respect to the number of distinct values it contains. This sampling may produce a starting estimate for a minimum field width needed to guarantee uniqueness. The field width may depend on the number of numbers available for each location. For example, a character may be a base 26 value (English, upper case), a base 52 value (English, upper and lower case), a base 37 value (Urdu), a base 24 value (Korean), a base 47,032 value (Chinese), and so on. Once the starting estimate for minimum field width is determined, a decision can be made concerning which and/or how many of the available changeable locations are to be required to be non-repeating. The number of changeable locations to be used to guarantee non-uniqueness may be larger than any individual string or digit. Thus, the values from a sequence number that are used to guarantee non-repeating values may be distributed over multiple portions of the mask.

In one example, an alternative syntax provided below may remove the necessity to sample the column to be masked. This syntax allows explicitly indicating which portions of the field are to be random and which portions of the field are to be random and non-repeating. This alternative syntax may be specified directly by some users. In a format processing phase, this syntax may be generated as an intermediate step before a mask generating SQL is computed. In one example, the license plate described above may be specified using:

RS(3, English, A, Z)+RD(1, English, 0, 9)+RDNR(4, English, 0, 9).

The RS function is a "random string" function that accepts four arguments. The first argument identifies the field width, the second argument specifies the desired character set, the third field identifies a starting element in the character set, and the fourth element identifies an ending element in the character set. One skilled in the art would appreciate that different syntax and different sets of arguments may be employed in different examples. One skilled in the art may also appreciate that a default language and/or base value for digits may be employed and that a subsequent action may map digits from numeric to string and may map a string or character in a first language to a string or character in a different language.

The RD function is a "random digit" function that also accepts four arguments. The first argument identifies the field width, the second argument specifies the desired character set, the third field identifies a starting element in the character set, and the fourth element identifies an ending element in the character set. Once again, one skilled in the art would appreciate that different syntax and different sets of arguments may be employed in different examples.

The RDNR function is a "random digit, non-repeating" function that accepts four similar arguments. A corresponding RSNR function (random string, non-repeating) may be provided. Additional functions may be provided to specify, for example, a "fixed string", a "fixed digit", and so on. Thus, example systems and methods may receive information concerning a mask to be produced where the information includes a field identifier, a field width, whether a value is to be random, whether a field is to be both random and non-repeating, whether a field is to be fixed, whether the field is numeric or alphabetic, how to assemble a larger field from a set of smaller fields, and so on. Some example systems and methods may receive less information concerning a mask to be produced. This smaller set of information may include, for example, just a field width and a field identifier.

Example systems and methods may perform a two phase process. The first phase may be referred to as a format processing phase. The second phase may be referred to as a mask execution phase. In one example, the format processing phase analyzes the formats specified for the mask and generates an SQL statement that, when executed, will produce the unique random mask values specified. While an SQL statement is described, it is to be appreciated that other query statements and/or executable statements may be produced during the format processing phase. The second phase may execute SQL to build a mapping table that can be used to provide mask values for values to be masked.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
WAN: wide area network.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and so on.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

FIG. 1 illustrates a table 100 that has a column to mask 110. The table 100 may also include several rows. Some rows may have distinct values in the column to mask 110. For example, row 120 may have a distinct value in column 110. Therefore, a mapping table 130 may store that distinct value, may store a mask for that distinct value, and may store a value in an index to facilitate relating the mask to the distinct value. Table 100 may also include other rows (e.g., 122, 124 . . . 128) that have distinct rows. Therefore table 130 may also store more values. Mapping table 130 may be organized with three columns. A first column 140 may store original values from column 110. A second column 150 may store NRRVs to mask the values from column 110 that are stored in column 140. The NRRVs in column 150 may be based on a sequence number associated with a row in table 100. For example, a sequence number for row 120 may be stored in column 160. A portion of this sequence number may be used to generate the mask stored in column 150.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

It will be appreciated that electronic and software applications may involve dynamic and flexible processes such that the illustrated blocks can be performed in other sequences different than the one shown and/or blocks may be combined or separated into multiple components. Blocks may also be performed concurrently, substantially in parallel, and/or at substantially different points in time. They may also be implemented using various programming approaches such as machine language, procedural, object oriented and/or artificial intelligence techniques. The foregoing applies to the example methodologies described herein.

Figure 2:
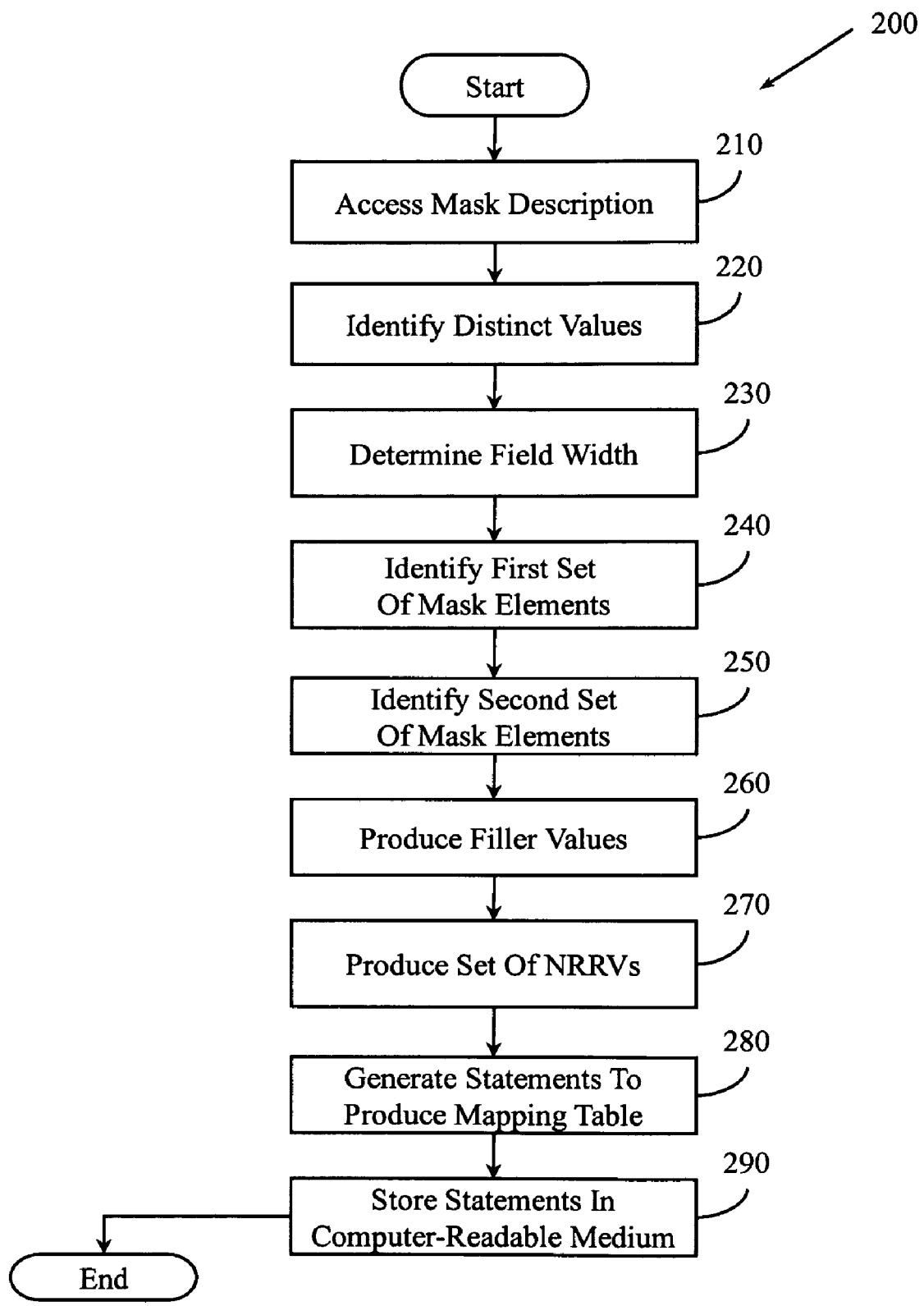
FIG. 2 illustrates an example method for producing NRRVs in user specified formats and character sets.

FIG. 2 illustrates a method 200. Method 200 may include, at 210, accessing data describing a mask for a value in a database table column to be masked. In one example, the mask may include different portions. For example, the mask may include a random string portion. A string may include one or more characters. An example string is "ABC", which includes characters "A", "B", and "C". The mask may also include a random number portion. A number may include one or more digits. An example number is "123", which includes the digits "1", "2", and "3". The random string portion and/or the random number portion may store changeable elements (e.g., character, digit) of a string and/or number. The digits and/or characters may be stored in a location in the mask. A mask may also include fixed portions. Recall the license plate example where the fourth element of the license plate identifier was a dash. Thus, a mask may include a fixed string portion and/or a fixed number portion.

The data describing the mask may include different information used to format the mask. For example, the information may include a user-specified character set for characters appearing in a masked value. In different examples a user could provide a language identifier (e.g., English, French), a closed set of characters (e.g., "abcdefgABCDEFG"), an open set of characters (e.g., "a . . . z"), and so on. The information may also include a user-specified starting location for an NRRV to appear in a mask. Similarly, the information may include a user-specified ending location for an NRRV. One skilled in the art will appreciate that other information may also be provided.

Method 200 may also include, at 220, identifying a number of distinct values in the database table column to be masked. The number of distinct values in a database column to be masked may be computed in different ways. In one example, the column may be sampled to estimate the number of distinct values. In another example, a "select distinct" operation may be performed and the number of distinct values computed from that operation. The "select distinct" operation may be, for example, an SQL operation. The number of distinct values is computed to determine how wide a field is needed to insure NRRVs.

Method 200 may also include, at 230, determining a field width of a field large enough to store a member of a set of NRRVs. In one example, the set of NRRVs is to have at least as many members as the number of distinct values. The field width may depend on various attributes of the mask. For example, the field width may depend, at least in part, on a user specified base for digits to appear in the field. In general, a number with a smaller base (e.g., base 2) will require a wider field than a number with a larger base (e.g., base 10). The field width may also depend, at least in part, on a user specified character set for digits to appear in the field. In general, a string with a smaller set of characters (e.g., 26 a-z) will require a wider field than a string with a larger set of characters (e.g., 52 a-zA-Z).

Method 200 may also include, at 240, identifying a first set of elements in the mask to store digits from an NRRV. This first set of elements needs to have at least as many members as the field width. In different examples and under different conditions the first set of elements may be a contiguous set or a non-contiguous set. A non-contiguous set may be required when the field width computed at 230 is wider than any single portion of the mask. Recall the license plate example, where a dash separated a string section from a numeric section. If the field width was so wide that it required a portion of both the string section and the numeric section, then the locations in the first set of elements would be non-contiguous. A non-contiguous set may simply be desired. Therefore, an NRRV may be distributed through various available changeable locations.

Method 200 may also include, at 250, identifying a second set of elements in the mask to store digits from a filler value.

The second set of elements is to include locations in the mask that are not in the first set of elements. Method 200 may also include, at 260, producing a set of filler values. In different examples filler values may take on different forms. For example, a filler value may be a random number. Recall that random numbers are not guaranteed to be non-repeating. In another example, the filler value may be a fixed value. In yet another example, a filler value may be selected from a table of filler values. Since the filler value guarantees neither randomness nor uniqueness, the filler value may be a non-random, repeating value.

Method 200 may also include, at 270, producing a set of NRRVs to be associated with the first set of elements. In one example, producing the set of NRRVs includes generating a set of sequence numbers. A member of the set of sequence numbers may be based, at least in part, on a row identifier of a row in the database column to be masked having a distinct value. The sequence number may be larger than the field width required to guarantee NRRVs. Therefore, a portion of an NRRV may be stored in the locations identified in the first set.

Method 200 may also include, at 280, generating a set of statements that when executed produce a mapping table that includes masks for distinct values in the database table column to be masked. In one example the set of statements may be a set of SQL statements. The mapping table may take on different forms. In one example, an entry in the mapping table may include a row number associated with a row having a distinct value in the database table column to be masked and a mask value for masking that distinct value. The mask value may include a portion of an NRRV and a portion of a filler value. In another example, an entry in the mapping table may also include a copy of the distinct value. It is to be appreciated that the mapping table may take on various forms and the order of columns and so on may vary between examples.

Having produced the statements, method 200 may conclude, at 290, by storing the set of statements in a computer-readable medium.

While FIG. 2 illustrates various actions occurring in serial, it is to be appreciated that various actions illustrated in FIG. 2 could occur substantially in parallel. By way of illustration, a first process could access a mask description, a second process could identify distinct values in a table, and a third process could determine a field width for the mask and identify locations in the mask to store portions of an NRRV and to store portions of a filler value. Additionally, a fourth process could produce filler values and NRRVs while a fifth process could generate and store SQL statements for producing a mapping table. While five processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions operable to perform method 200. While method 200 is described being stored on a computer-readable medium, it is to be appreciated that other example methods described herein can also be stored on a computer-readable medium.

Figure 3:
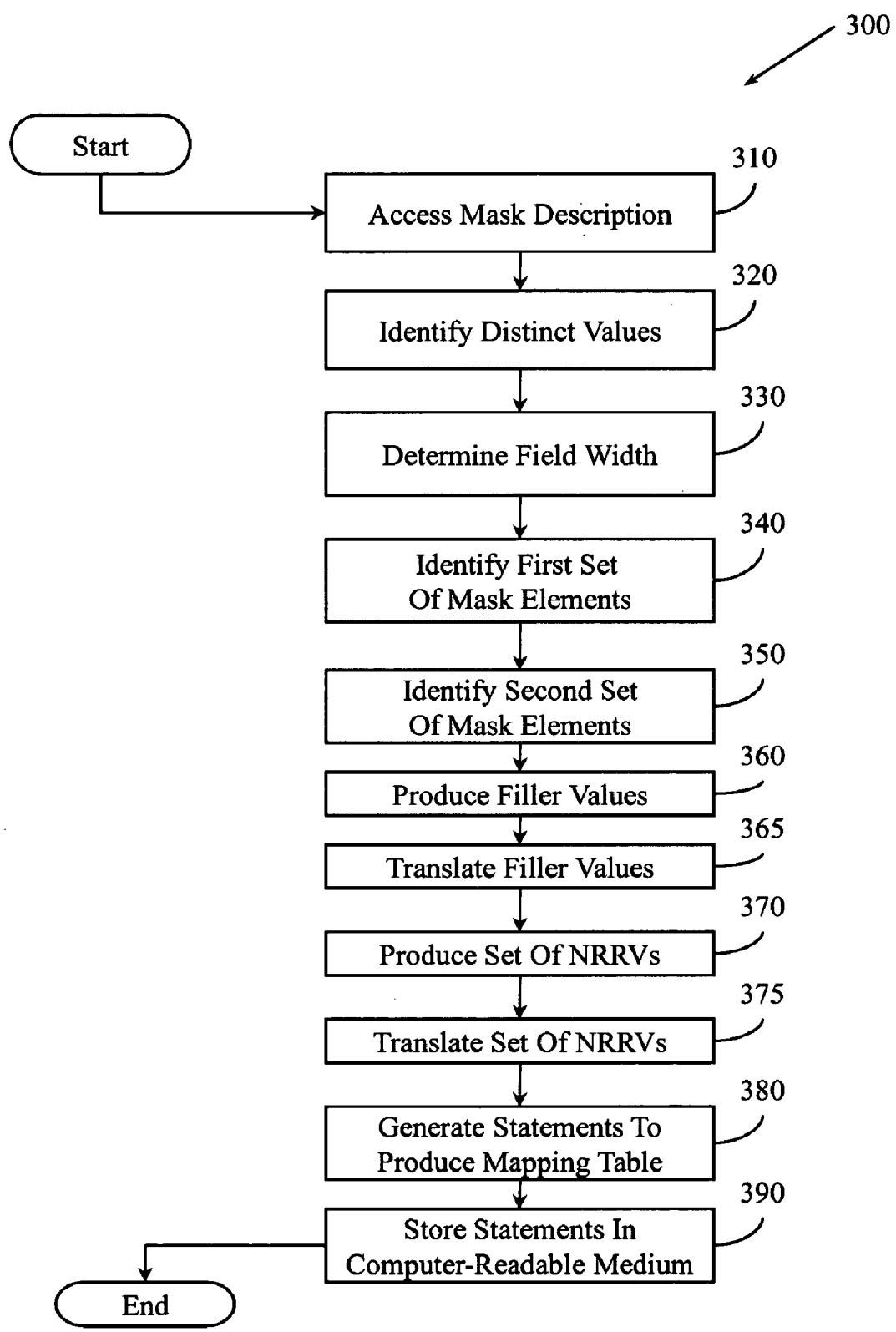
FIG. 3 illustrates another example method for producing NRRVs in user specified formats and character sets.

FIG. 3 illustrates a method 300 that includes several actions similar to those described in connection with method 200 (FIG. 2). For example, method 300 includes accessing a mask description at 310, identifying distinct values at 320, determining a field width at 330, identifying a first and second set of mask elements at 340 and 350, producing filler values and NRRVs at 360 and 370, and generating and storing SQL statements to produce a mapping table at 380 and 390. However, method 300 includes additional actions.

For example, method 300 includes, at 365, selectively translating members of the set of filler values produced at 360. The filler values may be numbers and/or characters. Thus, the translating may include different actions. The translating may include, for example, translating a digit from a first base to a second base, translating a digit from a numeric value to a character value, translating a character from a first character set to a second character set, and so on. By way of illustration, a filler value may include two base the digits associated with an English number set and may also include three characters associated with lower case English letters. Translating the filler value may include translating the base ten digits from an English number set to a different base and/or number set. Similarly, translating the filler value may include translating the three characters from lower case English letters to another language.

Method 300 may also include, at 375, selectively translating members of the set of NRRVs produced at 370. Like the filler values may be numbers and/or characters, the NRRVs may be numbers and/or characters. Therefore, translating an NRRV may also include different actions. The translating may include, for example, translating a digit from a first base to a second base, translating a digit from a numeric value to a character value, translating a character from a first character set to a second character set, and so on.

Figure 4:
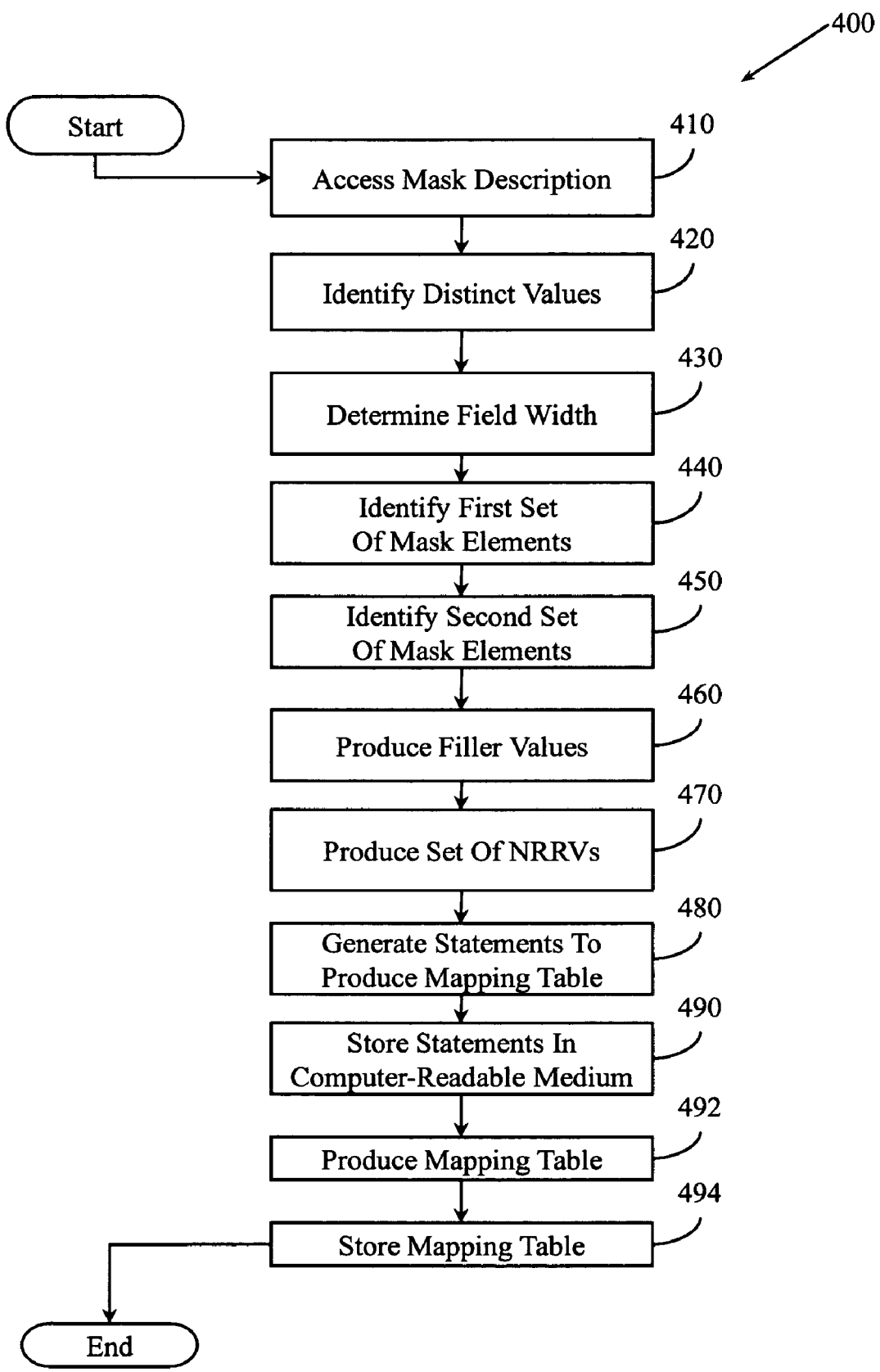
FIG. 4 illustrates another example method for producing NRRVs in user specified formats and character sets.

FIG. 4 illustrates a method 400 that includes several actions similar to those described in connection with method 200 (FIG. 2). For example, method 400 includes accessing a mask description at 410, identifying distinct values at 420, determining a field width at 430, identifying a first and second set of mask elements at 440 and 450, producing filler values and NRRVs at 460 and 470, and generating and storing SQL statements to produce a mapping table at 480 and 490. However, method 400 includes additional actions.

For example, method 400 includes, at 492, producing the mapping table. Producing the mapping table may include executing the statements generated at 480 and stored at 490. As part of producing the mapping table, method 400 may determine whether the state of the database table column to be masked has changed. For example, there may be a greater or lesser number of distinct values in the column. Therefore, producing the mapping table at 492 may include recomputing the number of distinct values in the database table column to be masked and, based on the recomputing, selectively recomputing the first set of elements and the second set of elements.

Producing the mapping table at 492 may include, for example, controlling a table generating logic to execute the set of statements to produce the mapping table. Method 400 may then conclude, at 494, by storing the mapping table.

Figure 5:
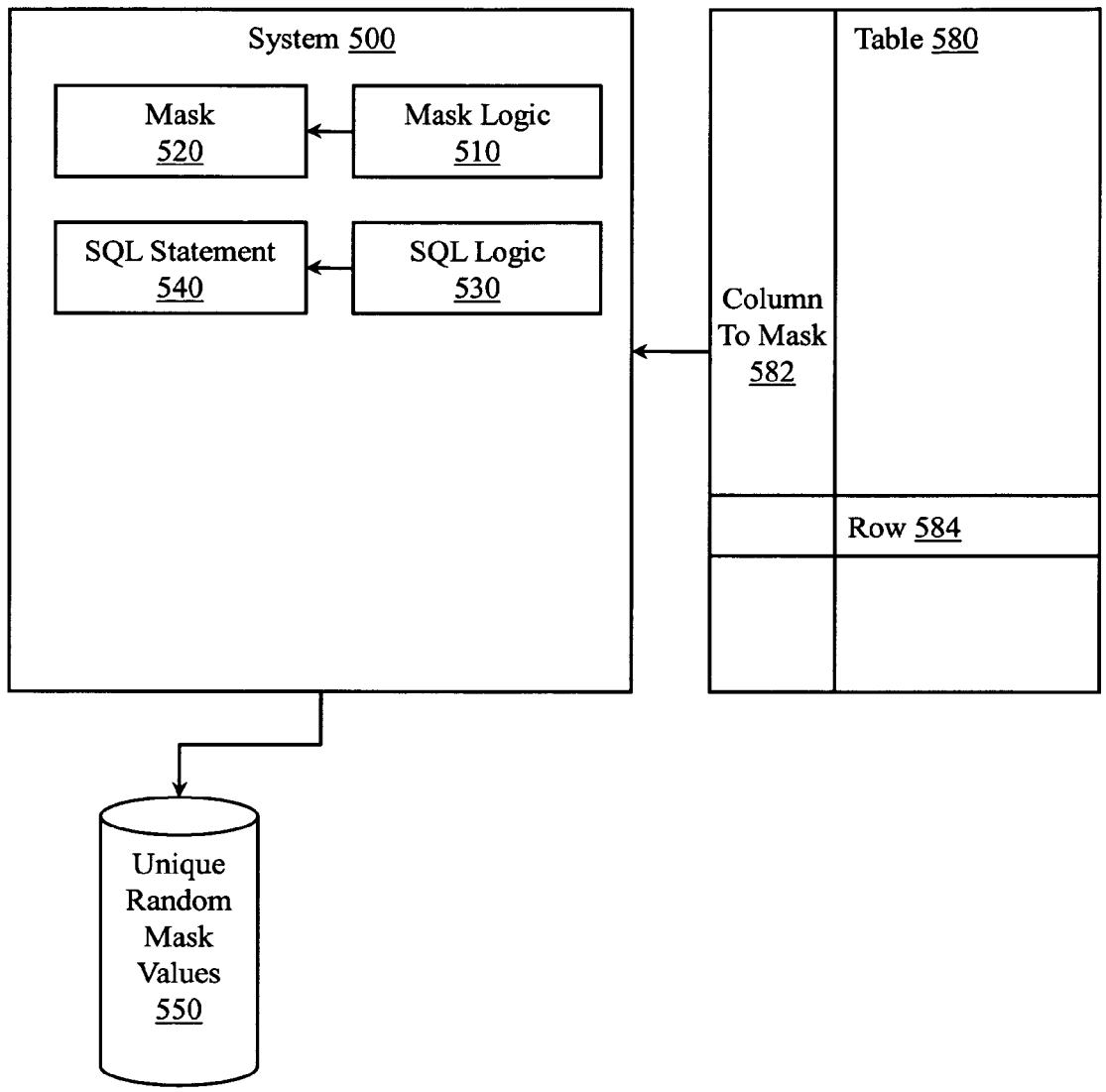
FIG. 5 illustrates an example system for producing NRRVs in user specified formats and character sets.

FIG. 5 illustrates a system 500 associated with producing NRRVs that comply with user specified formats and character sets. The NRRVs may be used, for example, in data masking operations. Table 580 may include a column 582 whose values are to be masked by false yet similar looking data. Table 580 may have a number of rows 584 in which distinct values are found in column 582. A user may identify a format for a mask to apply to hide the data associated with column 582.

Therefore system 500 includes a mask logic 510 that will analyze formats for a mask 520 to be used in data masking. The mask 520 is to be used to mask data in database column 582 to masked. In one example, the mask logic 510 is to identify a first set of locations in the mask 520. This first set of locations is to store elements of unique random mask values. For example, to guarantee NRRVs, a numeric value with six digits may be required. Thus, the first set of locations is to include six locations in mask 520 that can store the six digits of the value that guarantees the NRRVs. In one example, the six locations do not have to be contiguous. Therefore the six locations in the first set of locations may be distributed in different mask locations. The mask logic 510 may also identify a second set of locations in the mask 520. This second set of locations is to store random mask values that do not need to be unique.

System 500 also includes an SQL logic 530 to produce an SQL statement 540. While a single SQL statement 540 is described, it is to be appreciated that SQL statement 540 may include a set of statements. The SQL statement 540, when executed, is to produce a set of unique random mask values 550. The unique random mask values 550 are to comply with the formats for the mask 520. In one example, the unique random mask values 550 will be based, at least in part, on row identifiers associated with rows in table 580 in which distinct values appear in column 582.

Figure 6:
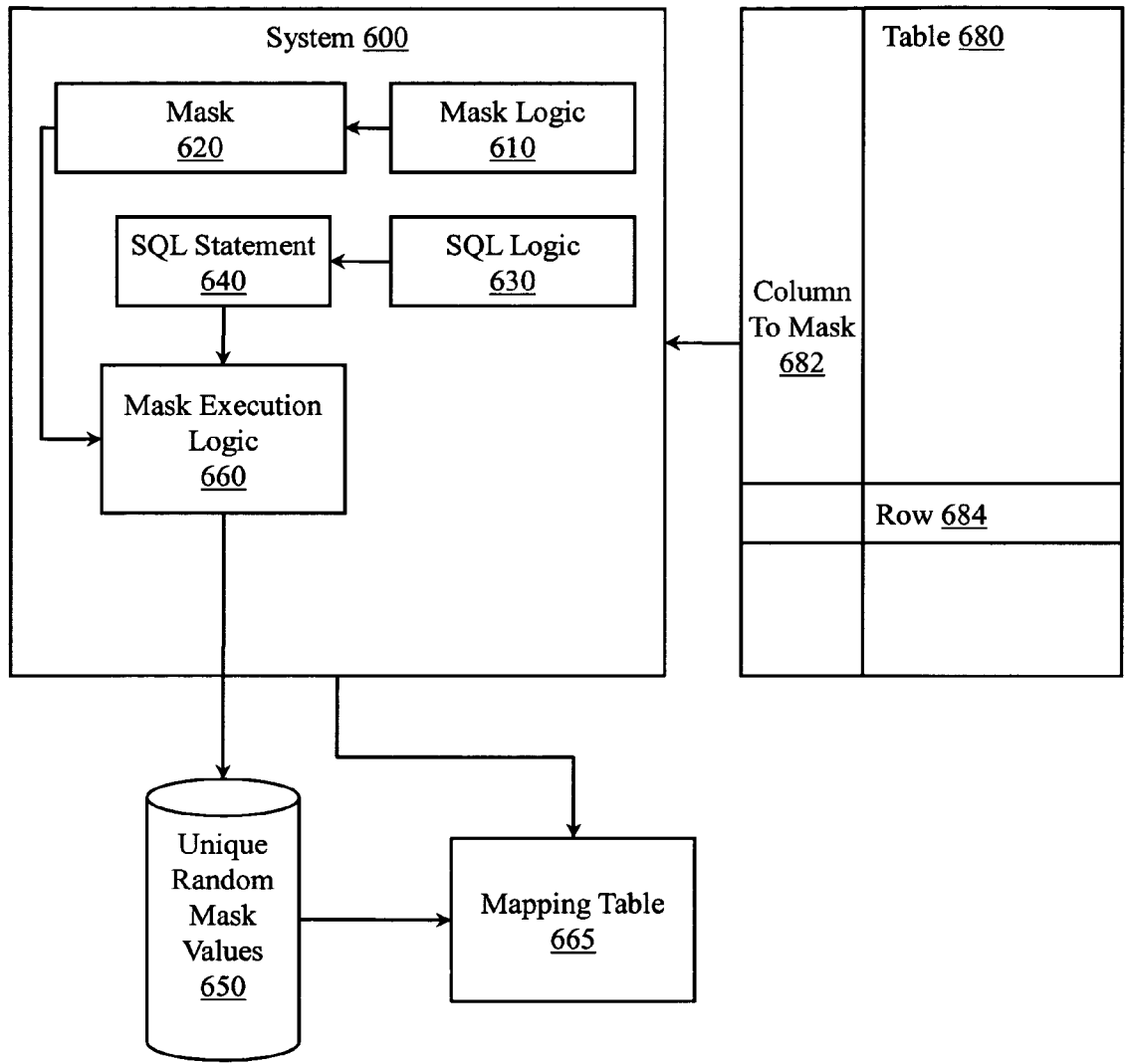
FIG. 6 illustrates another example system for producing NRRVs in user specified formats and character sets.

FIG. 6 illustrates a system 600 that has some elements similar to those described in connection with system 500 (FIG. 5). For example, system 600 includes a mask logic 610 to produce a mask 620, and an SQL logic 630 to produce an SQL statement 640. System 600 is to produce unique random mask values 650 to be used to mask data in a column 682 in a table 680. Data to be masked may include a unique value in a row 684 in the table 680. System 600 also includes an additional element.

System 600 includes a mask execution logic 660. Mask execution logic 660 is to execute the SQL statement 640 to generate a mapping table 665. Mapping table 665 will include values based on the unique random mask values 650. Mapping table 665 may also include distinct values from the database column 682. In one example, the unique random mask values 650 may be based on row identifiers associated with table 680. Thus, mapping table 665 may include a mask value, a distinct value to be masked, and a row identifier associated with the row in table 680 with which a distinct value is generated.

In one example, the mask execution logic 660 is to selectively adapt, at execution time, to a change in the number of distinct values in the database column 682 to be masked. The adapting may include, for example, selectively increasing the size of the first set of locations if the number of distinct locations has increased to an amount that can no longer be handled by the original first set of locations. In one example, if the number of distinct values has decreased, then mask execution logic 660 may not make a selective adaptation.

Figure 7:
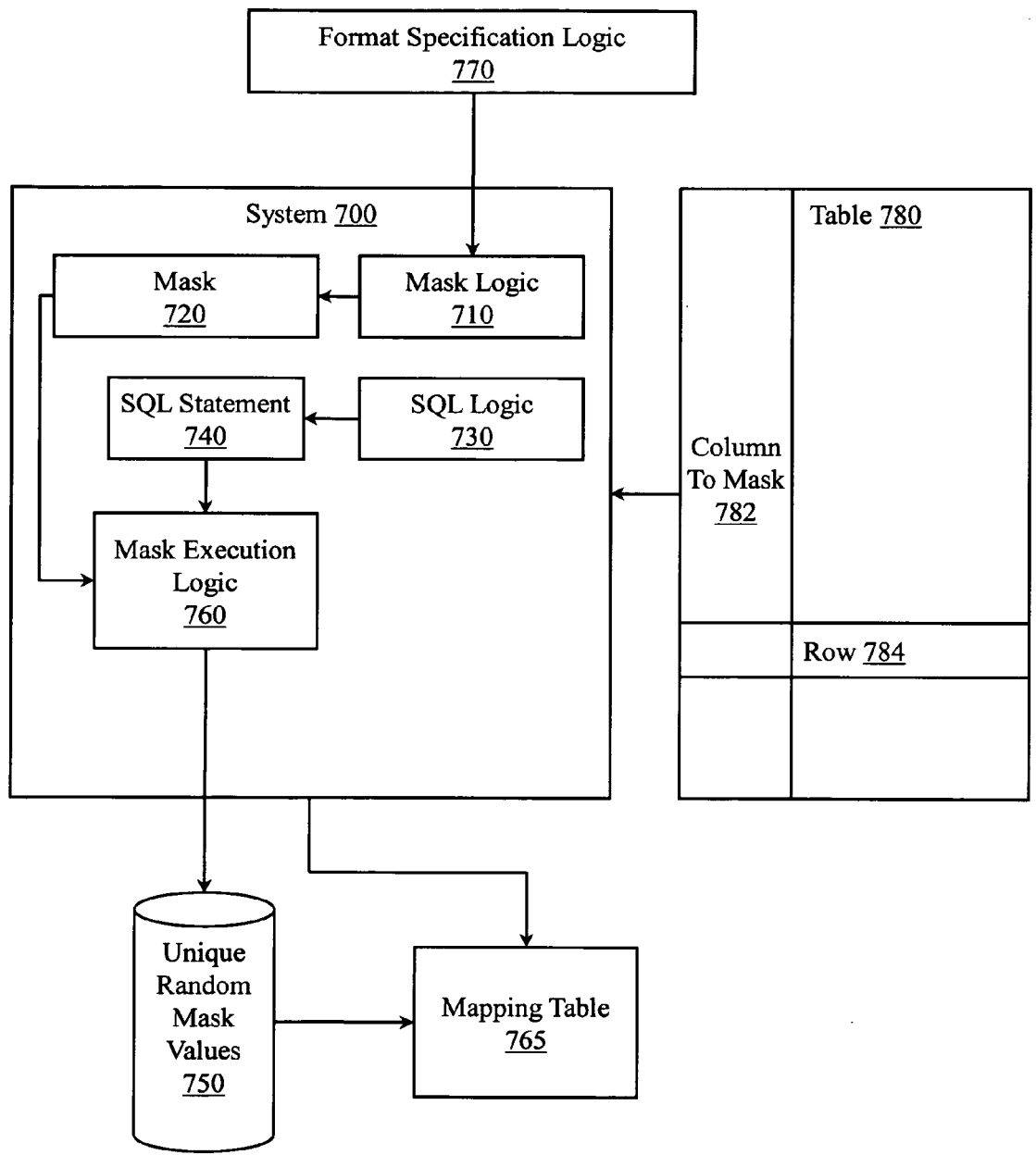
FIG. 7 illustrates another example system for producing NRRVs in user specified formats and character sets.

FIG. 7 illustrates a system 700 that has some elements similar to those described in connection with system 600 (FIG. 6). For example, system 700 includes a mask logic 710 to produce a mask 720, and an SQL logic 730 to produce an SQL statement 740 that may be executed by a mask execution logic 760. System 700 is to produce unique random mask values 750 to be used to produce a mapping table 765 to store mask data for a column 782 in a table 780. Data to be masked may include a unique value in a row 784 in the table 780. System 700 also includes an additional element.

System 700 includes a format specification logic 770. Format specification logic 770 is to provide information describing mask 720. In one example, format specification logic 770 may include a user interface to facilitate a user specifying information about mask 720. The information to be specified may include, for example, a character set identifier to identify a character set for characters to be included in a random mask value. For example, the character set identifier may specify a language for characters, a closed set of characters, an open set of characters, and so on. The information may also include a start value for a character to be included in a random mask value and/or an end value for a character to be included in a random mask value. The start and end values may identify where in a mask an NRRV is to begin and/or end. The information may also include, for example, a base for a digit to be included in a random mask value, a start value for a digit to be included in a random mask value, and an end value for a digit to be included in a random mask value.

In one example format specification logic 770 may provide information concerning a desired field width for the mask 720. Mask logic 710 may determine a minimum required field width for an NRRV to guarantee NRRVs. If the minimum required field width is less than or equal to the desired field width, then the desired field width may be employed. If the minimum required field width exceeds the desired field width, then the minimum required field width may be employed. While seven attributes are described as being provided from the format specification logic 770, it is to be appreciated that a greater and/or lesser number of attributes may be specified.

Figure 8:
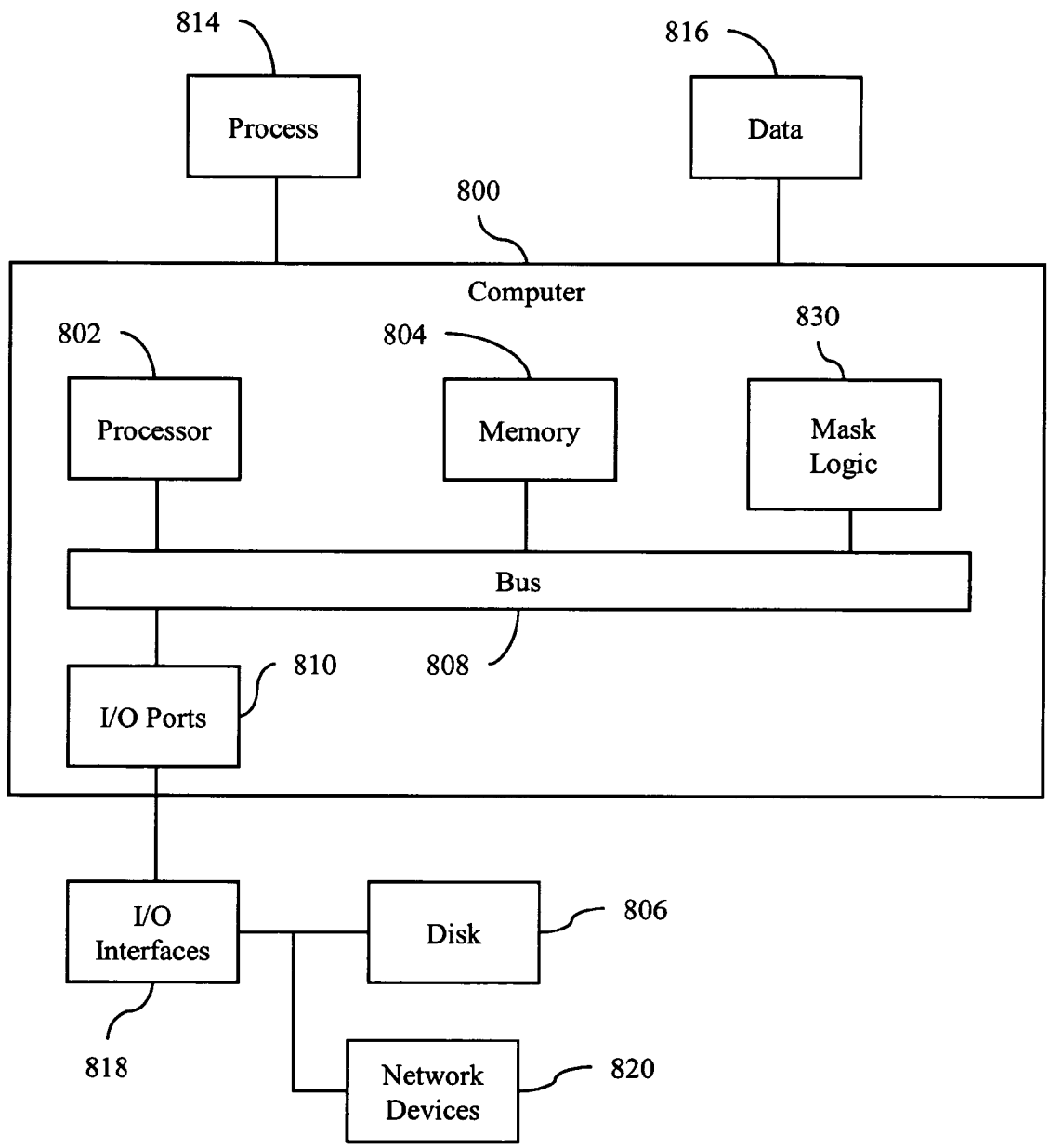
FIG. 8 illustrates an example computing environment in which example systems and methods illustrated herein can operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a mask logic 830 configured to facilitate generating NRRVs for use in data masking. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

Thus, logic 830 may provide means (e.g., hardware, software, firmware) for specifying attributes of a mask to be used to mask data in a database column. The attributes may include, for example, a character set, a mask width, a mask format, the location of a fixed portion of a mask, and so on. Logic 830 may also provide means (e.g., hardware, software, firmware) for generating a set of unique random values to mask data in the database column. The set of unique random values are to comply with the attributes of the mask. In one example, the set of unique random values may be based on row identifiers associated with rows having distinct values in the database column. Logic 830 may also provide means (e.g., hardware, software, firmware) for generating a mapping table that includes the set of unique random values and a set of distinct values from the database column.

The various means associated with logic 830 may be implemented, for example, as an ASIC programmed to provide NRRVs that comply with user specified formats, character sets, ranges, and so on. The means associated with logic 830 may also be implemented as computer executable instructions that are presented to computer 800 as data 816 that are temporarily stored in memory 804 and then executed by processor 802.

Generally describing an example configuration of the computer 800, the processor 802 may be a variety of various processors including dual microprocessor and other multiprocessor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device)

818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing processor executable instructions operable to control the processor to perform a method, the method comprising:

accessing data describing a mask for a value in a database table column to be masked;

identifying a number of distinct values in the database table column to be masked;

determining a field width of a field large enough to store a member of a set of non-repeating random values (NRRVs), where the set of NRRVs has at least as many members as the number of distinct values;

identifying a first set of elements in the mask to store digits from an NRRV, where the first set of elements has at least as many members as the field width;

identifying a second set of elements in the mask to store digits from a filler value, where the second set of elements includes locations in the mask that are not in the first set of elements;

producing a set of filler values to be associated with the second set of values, where the filler value is one of, a random number, a fixed value, and a value from a table of filler values;

selectively translating members of the set of filler values, where selectively translating members of the set of filler values includes one or more of, translating a digit from a first base to a second base, translating a digit from a numeric value to a character value, and translating a character from a first character set to a second character set;

producing a set of NRRVs to be associated with the first set of elements;

generating a set of statements that when executed produce a mapping table that includes masks for distinct values in the database table column to be masked, where data describing a mask includes one or more of, a user-specified character set for characters appearing in a masked value, a user-specified starting location for a non-repeating random value (NRRV), and a user-specified ending location for an NRRV; and storing the set of statements in a computer-readable medium.

2. The non-transitory computer-readable medium of claim 1, where the mask includes one or more of, a random string portion, and a random number portion, where a string includes one or more characters, and where a number includes one or more digits.

3. The non-transitory computer-readable medium of claim 2, where the mask includes one or more of, a fixed string portion, and a fixed number portion.

4. The non-transitory computer-readable medium of claim 1, where identifying the number of distinct values includes sampling the database column to be masked.

5. The non-transitory computer-readable medium of claim 1, where identifying the number of distinct values includes evaluating the results of an SQL select distinct operation.

6. The non-transitory computer-readable medium of claim 1, where the field width depends, at least in part, on a user specified base for digits to appear in the field.

7. The non-transitory computer-readable medium of claim 1, where the field width depends, at least in part, on a user specified character set for digits to appear in the field.

8. The non-transitory computer-readable medium of claim 1, including selectively translating members of the set of NRRVs.

9. The non-transitory computer-readable medium of claim 8, where selectively translating members of the set of NRRVs includes one or more of, translating a digit from a first base to a second base, translating a digit from a numeric value to a character value, and translating a character from a first character set to a second character set.

10. The non-transitory computer-readable medium of claim 1, where producing the set of NRRVs includes generating a set of sequence numbers, where a member of the set of sequence numbers is based, at least in part, on a row identifier of a row in the database column to be masked having a distinct value.

11. The non-transitory computer-readable medium of claim 1, where the set of statements is a set of SQL statements.

12. The non-transitory computer-readable medium of claim 11, where a mask value generator is to produce a complete set of masks for distinct values in the database table column to be masked in O(N) time by executing the set of SQL statements.

13. The non-transitory computer-readable medium of claim 1, where an entry in the mapping table includes:
   a row number associated with a row having a distinct value in the database table column to be masked; and
   a mask value.

14. The non-transitory computer-readable medium of claim 13, where an entry in the mapping table also includes a copy of the distinct value from a row having a distinct value in the database table column to be masked.

15. The non-transitory computer-readable medium of claim 1, where the method includes producing the mapping table.

16. The non-transitory computer-readable medium of claim 15, where producing the mapping table includes:
   recomputing the number of distinct values in the database table column to be masked;
   selectively recomputing the first set of elements and the second set of elements; and
   controlling a table generating logic to execute the set of statements to produce the mapping table, where the mapping table depends, at least in part, on the recomputed number of distinct values.

17. The non-transitory computer-readable medium of claim 1,
   where the mask includes one or more of, a random string portion, a random number portion, a fixed string portion, and a fixed number portion, and where a string includes one or more characters, and where a number includes one or more digits;
   where the data describing the mask includes one or more of, a user-specified character set for characters appearing in a masked value, a user-specified starting location for an NRRV, and a user-specified ending location for an NRRV;
   where identifying the number of distinct values includes one or more of, sampling the database column to be masked, and evaluating the results of an SQL select distinct operation;
   where the field width depends, at least in part, on a user specified base for digits to appear in the field and on a user specified character set for digits to appear in the field;
   where the filler value is one of, a random number, a fixed value, and a value from a table of filler values;
   where the set of statements is a set of SQL statements;
   where an entry in the mapping table includes a row number associated with a row having a distinct value in the database table column to be masked, a mask value, and a copy of the distinct value from a row having a distinct value in the database table column to be masked; and
   where the method includes selectively translating members of the set of filler values, where translating members of the set of filler values includes one or more of, translating a digit from a first base to a second base, translating a digit from a numeric value to a character value, and translating a character from a first character set to a second character set; and
   where the method includes selectively translating members of the set of NRRVs, where translating members of the set of NRRVs includes one or more of, translating a digit from a first base to a second base, translating a digit from a numeric value to a character value, and translating a character from a first character set to a second character set; and
   where producing the set of NRRVs includes generating a set of sequence numbers, where a member of the set of sequence numbers is based, at least in part, on a row identifier of a row in the database column to be masked having a distinct value; and
   where the method includes producing the mapping table.

18. A system, comprising:
   a processor;
   a memory; and
   an interface connecting the processor, the memory, and a set of logics, the set of logics comprising:
   a mask logic to analyze formats for a mask to be used in masking data in a database column to be masked, where analyzing formats for a mask comprises:
      accessing data describing a mask for a value in the database table column to be masked;
      identifying a number of distinct values in the database table column to be masked;
      determining a field width of a field large enough to store a member of a set of non-repeating random values (NRRVs), where the set of NRRVs has at least as many members as the number of distinct values; and
      identifying a first set of elements in the mask to store digits from an NRRV, where the first set of elements has at least as many members as the field width; and
   an SQL logic to produce an SQL statement to produce a set of unique random mask values according to the formats for the mask,
   where a mask value is one of, a random number, a fixed value, and a value from a table of mask values, where data describing a mask includes one or more of, a user-specified character set for characters appearing in a masked value, a user-specified starting location for a non-repeating random value (NRRV), and a user-specified ending location for an NRRV;
   the SQL logic also being configured to selectively translate mask values by one or more of, translating a digit from a first base to a second base, translating a digit from a numeric value to a character value, and translating a character from a first character set to a second character set.

19. The system of claim 18, where the mask logic is to identify a first set of locations in the mask to store elements of unique random mask values and where the mask logic is to identify a second set of locations in the mask to store random mask values that do not need to be unique.

20. The system of claim 19, where the SQL logic is to configure the SQL statement to produce the set of unique random mask values based, at least in part, on row identifiers associated with rows having distinct values in the database column to be masked.

21. The system of claim 20, including:
   a mask execution logic to execute the SQL statement to generate a mapping table that includes distinct values from the database column to be masked and mask values to mask the distinct values.

22. The system of claim 21, where the mask execution logic is to selectively adapt, at execution time, to a change in the number of distinct values in the database column to be masked, where the adapting includes selectively increasing the size of the first set of locations.

23. The system of claim 22, including:
a format specification logic to provide one or more of, a character set identifier to identify a character set for characters to be included in a random mask value, a start value for a character to be included in a random mask value, an end value for a character to be included in a random mask value, a base for a digit to be included in a random mask value, a start value for a digit to be included in a random mask value, an end value for a digit to be included in a random mask value, and a field width for the mask.

* * * * *

UNITED STATES PATENT AND TRADEMARK OFFICE
CERTIFICATE OF CORRECTION

PATENT NO. : 7,882,134 B2
APPLICATION NO. : 12/150392
DATED : February 1, 2011
INVENTOR(S) : Pattabhi et al.

It is certified that error appears in the above-identified patent and that said Letters Patent is hereby corrected as shown below:

In column 10, line 12, delete "base the" and insert -- base ten --, therefor.

Signed and Sealed this
Fourth Day of October, 2011

David J. Kappos
*Director of the United States Patent and Trademark Office*